United States Patent
Patel (10) Patent No.: US 10,288,307 B2
(45) Date of Patent: May 14, 2019

(54) CONTROLLER AND PROCESS FOR CONTROLLING A PLURALITY OF RESOURCES WITHIN A WORKPLACE

(71) Applicant: ECHOSTAR TECHNOLOGIES INTERNATIONAL CORPORATION, Englewood, CO (US)

(72) Inventor: Bhavesh Patel, Woodstock, GA (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 45 days.

(21) Appl. No.: 15/395,204

(22) Filed: Dec. 30, 2016

(65) Prior Publication Data
US 2018/0188703 A1 Jul. 5, 2018

(51) Int. Cl.
| | |
|---|---|
| *G05B 19/042* | (2006.01) |
| *H04Q 9/00* | (2006.01) |
| *F24F 11/00* | (2018.01) |
| *F24F 11/30* | (2018.01) |
| *F24F 11/62* | (2018.01) |
| *G05B 15/02* | (2006.01) |
| *G06Q 10/10* | (2012.01) |

(Continued)

(52) U.S. Cl.
CPC .............. *F24F 11/30* (2018.01); *F24F 11/62* (2018.01); *G05B 15/02* (2013.01); *H04Q 9/00* (2013.01); *F24F 11/46* (2018.01); *F24F 11/61* (2018.01); *F24F 11/63* (2018.01); *F24F 2120/10* (2018.01); *G05B 2219/25011* (2013.01); *G05B 2219/2614* (2013.01); *G05B 2219/2642* (2013.01); *G06Q 10/1095* (2013.01); *H04Q 2209/47* (2013.01)

(58) Field of Classification Search
CPC ........ G05B 19/042; G05B 2219/25011; G05B 2219/2614; F24F 11/30; F24F 11/62; F24F 11/63; F24F 11/46; G06Q 10/1095; H04Q 9/00; H04Q 2209/47
See application file for complete search history.

(56) References Cited

U.S. PATENT DOCUMENTS

| | | | |
|---|---|---|---|
| 7,395,324 B1 * | 7/2008 | Murphy ............ | G06F 17/30067 707/E17.01 |
| 7,783,727 B1 * | 8/2010 | Foley ................ | H04L 29/12886 709/220 |

(Continued)

OTHER PUBLICATIONS

U.S. Appl. No. 15/332,617, filed Oct. 24, 2016.

*Primary Examiner* — Ramesh B Patel
(74) *Attorney, Agent, or Firm* — Lorenz & Kopf LLP (57) ABSTRACT

Systems, devices and processes effectively and efficiently manage the energy consumption of shared workspaces such as meeting rooms and the like. A central control device receives scheduling information and/or sensor information relating to meeting attendees, for example, that can be used to activate or deactivate resources within the shared meeting space. Lights, computing equipment, heating/ventilation/air conditioning (HVAC) or other climate controls, electrical outlets, food or beverage preparation equipment and/or other energy-consuming resources within the workplace can be automatically controlled for efficient operation and energy conservation.

20 Claims, 3 Drawing Sheets

(51) Int. Cl.
  *F24F 11/63* (2018.01)
  *F24F 11/46* (2018.01)
  *F24F 120/10* (2018.01)
  *F24F 11/61* (2018.01)

(56) References Cited

U.S. PATENT DOCUMENTS

| | | | |
|---|---|---|---|
| 2004/0095237 A1* | 5/2004 | Chen | G06F 11/0748 340/506 |
| 2004/0267623 A1* | 12/2004 | Vivadelli | G06Q 10/06 379/212.01 |
| 2008/0059254 A1* | 3/2008 | Vivadelli | G06Q 10/02 705/5 |
| 2008/0281472 A1* | 11/2008 | Podgorny | G05B 15/02 700/276 |
| 2009/0065596 A1* | 3/2009 | Seem | F24F 11/30 236/51 |
| 2012/0066168 A1* | 3/2012 | Fadell | G05B 15/02 706/52 |
| 2013/0103622 A1* | 4/2013 | Matsuoka | H04L 12/2825 706/12 |
| 2013/0338839 A1* | 12/2013 | Rogers | G05D 23/1904 700/278 |
| 2016/0231721 A1* | 8/2016 | Lakshmanan | H01H 71/00 |
| 2016/0327921 A1* | 11/2016 | Ribbich | F24F 11/30 |
| 2017/0033944 A1* | 2/2017 | Nadathur | H04L 12/2816 |

* cited by examiner

CONTROLLER AND PROCESS FOR CONTROLLING A PLURALITY OF RESOURCES WITHIN A WORKPLACE

TECHNICAL FIELD

The following discussion generally relates to environmental controls within a workplace or other environment. More particularly, the following discussion relates to systems, devices and processes to control workplace resources based upon events occurring within the workplace.

BACKGROUND

Modern offices, factories and other workplaces typically have at least some shared rooms or other workspaces. Often, these shared spaces can consume a relatively large amount of energy, even when they are not in use. Heating and air conditioning unused spaces can be expensive and wasteful, for example. Moreover, given that a typical desktop computer can consume a kilowatt or more of energy every hour, unused computing resources can be expensive if they are not powered down after use. Lights, fans, humidifiers/dehumidifiers and other electrical devices can also consume additional energy if they are left on when the space is not in use.

Some office spaces make use of movement sensors for activating or deactivating lights, but these can often be unreliable. If meeting attendees remain seated for a relatively long time, for example, many movement sensors will automatically darken the room even though the meeting is still going on. Other attempts to automate the energy consumption of shared workspaces have been ineffectual. Numerous home and office products allow lights and other resources to be remotely activated, but these typically rely upon manual human operation, without regard to resources that are shared between different people. Further, various scheduling programs exist for scheduling the use of meeting rooms and other shared resources, but at present these do not help in managing the energy consumption of such spaces.

It is therefore desirable to create systems, devices and processes for more efficient control of one or more resources operating within a building or other workplace. These and other features and characteristics will become apparent from the subsequent detailed description and the appended claims, taken in conjunction with the accompanying drawings and this background section.

BRIEF SUMMARY

Various systems, devices and processes have been developed to effectively and efficiently manage the energy consumption of shared workspaces such as meeting rooms and the like. In various embodiments, a central controller receives scheduling information and/or sensor information relating to meeting attendees that can be used to activate or deactivate resources within the shared space. Lights, computing equipment, heating/ventilation/air conditioning (HVAC) or other climate controls, electrical outlets, food or beverage preparation equipment and/or other energy-consuming resources within the workplace can be separately controlled for efficient operation and energy conservation, as described more fully below.

Various embodiments provide a process executable by a controller device that controls a plurality of resources operating within a workplace. The process suitably comprises: scheduling, by the controller device, a plurality of activities occurring within shared spaces of the workplace, wherein each of the activities is associated with at least one of the resources that is physically located in the shared space where the activity is occurring; associating, by the controller device, each of the resources for each of the activities with a trigger; and upon an occurrence of the trigger, the controller device automatically directing the actuation of the resource that is associated with the trigger.

This basic process may be enhanced in any number of ways. The activity, for example, could be a meeting occurring in the shared space of the workplace, wherein a first one of the triggers is an event-based trigger that activates lighting resources in the shared space when a participant in the meeting is detected to be moving toward the shared space, and wherein a second one of the triggers is a schedule-based trigger that automatically activates an HVAC resource associated with the shared space of the workplace at a predetermined time prior to the meeting to thereby adapt the climate of the shared space in time for the meeting.

Even further, some embodiments provide that a third one of the triggers is an event-based trigger that deactivates the lighting resources in the shared space and that automatically deactivates the HVAC resource associated with the shared space of the workplace to thereby adapt the climate of the shared space after the meeting has concluded.

Other embodiments provide a controller device that controls a plurality of resources operating within a workplace, the controller device comprising a processor, a memory and input/output interfaces, wherein the memory stores a plurality of instructions that, when executed by the processor, perform the various processes described herein.

Many alternate embodiments could be equivalently formulated in place of the examples presented above. The above embodiments and many equivalent embodiments are described in increasing detail below.

BRIEF DESCRIPTION OF THE DRAWING FIGURES

Example embodiments will hereinafter be described in conjunction with the following drawing figures, wherein like numerals denote like elements.

DETAILED DESCRIPTION

The following detailed description of the invention is intended as an example that should not limit the invention or the application and uses of the invention. Furthermore, there is no intention to be bound by any theory presented in the preceding background or the following detailed description.

Generally speaking, meeting rooms and other shared spaces within the workplace can consume a substantial amount of energy even when the spaces are not in use. Heating, ventilation and air conditioning (HVAC) or other climate controls, for example, are often left on in such spaces so that the temperature is comfortable as soon as a meeting starts, or another use begins. Often, meeting attendees can be careless about turning off lights, computers, audio/visual (AV) equipment, food and beverage equipment (e.g., coffee makers) and the like. Each of these items is a resource that can consume expensive energy. Moreover, it may be desirable to power down energy-consuming resources (e.g., computers, lights, climate controls) when the meeting or other activity is completed.

The activation and deactivation of electrical or other energy-consuming resources within the workplace can therefore be automated so that energy-consuming resources are active when needed, but deactivated when they are no longer needed. When a meeting is occurring in a conference room or other shared space, for example, it is generally desirable that the room be at a comfortable temperature at the start of the meeting, and that lights and other appliances be available for use during such times. After the meeting is complete, however, the lights and appliances should be turned off (or at least put into sleep mode) to reduce energy consumption. Moreover, the climate of the room can be adjusted for better energy efficiency, even if the temperature becomes somewhat uncomfortable while the space is idle.

To that end, an automated controller device is programmed to maintain a schedule of activities (e.g., meetings, gatherings or the like) where conference rooms, offices or other portions of the workplace are in use. Resources in the portion of the workplace are activated based upon triggers that are caused by real-world events (e.g., a worker leaving his or her office to attend the meeting), and/or by scheduled events. This can allow, for example, the climate controls in a shared space to be reduced or disabled during times that the shared space is idle, but activated prior to a scheduled meeting or other activity so that the room is comfortable when the activity begins. Other events that can trigger activation or deactivation of energy-consuming resources could include a proximity sensing of a meeting participant leaving his or her office just prior to the scheduled activity, or any number of other events as described more fully below. Further embodiments could also disable lights, computers, climate controls and/or other resources within the worker's office or other private workspace while the worker is attending the meeting at the different location. By automating the activation and deactivation of energy-consuming resources within work spaces, the energy consumption of the work place can be more efficiently managed, thereby conserving natural resources and reducing expense.

Figure 1:
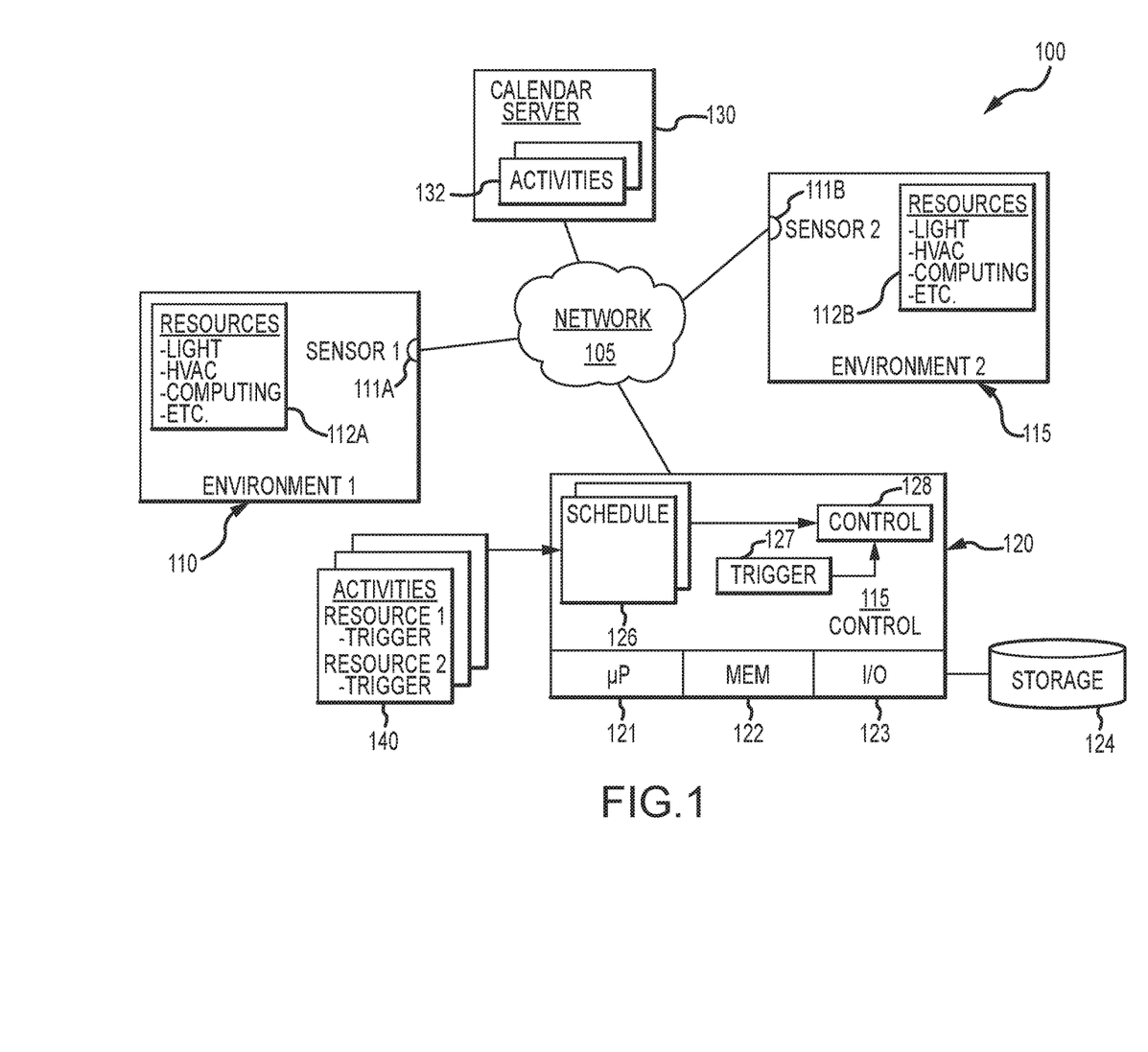
FIG. 1 is a diagram of an example control system operating within a shared workplace.

Turning now to the drawing figures and with initial reference to FIG. 1, an example workplace 100 suitably includes multiple rooms or other environments 110, 115 each representing a public or private space within a workplace. Each environment 110, 115 will typically have any number of energy-consuming resources 112 (lights, outlets, computers, climate controls, etc.) that are remotely-controllable via a local or wide area network 105. The various actuators will vary from device to device and embodiment to embodiment, but a wealth of home and office control components are now available from a variety of suppliers. Different types of actuators could activate, deactivate or otherwise control lights, climate controls, door locks, alarms, outlets and/or any number of other resources 112 that are associated with the different environments 110, 115. Resources 112 could also include controllable resources executing within a personal computer or the like. The Preboot Execution Environment (PXE) features built into many conventional network interface cards (NICs), for example, could be used to remotely activate or deactivate computers on a network 105 so that the computer could be controlled as another resource 112. Any number of additional or alternate resources 112 can be actuated or otherwise controlled in a wide array of equivalent embodiments.

As discussed more fully below, each environment 110, 115 may contain one or more sensors 111A-B for detecting persons (or lack of persons) in the environment 110, 115. Sensors 111 may be, for example, cameras that are used to capture imagery of the space's floor, walls and/or ceiling so that persons or other obstructing objects can be identified though image processing. Sensors 120 may be equivalently implemented using a grid of infrared, weight, pressure, temperature or other sensors that collectively detect the occupancy of the environment 110, 115. Still other types of sensors include optical or radio frequency sensors that detect the presence of badges, tags or other items carried by people in the environment 110, 115. A radio frequency identification (RFID) reader, for example, could detect the presence of one or more RFID tags in the area through conventional broadcast/response techniques. Other sensors 111 could be implemented within computer devices that use virtual fences or similar concepts to detect mobile phones, tablets or other computing devices carried by different persons. If a phone or other device is detected in the proximity of the sensor 111 (e.g., through Wi-fi or GPS geolocation, through the device joining a particular Wi-Fi or Bluetooth zone, or through other wireless location techniques), then the owner of the phone can be deduced to be present in the environment 110, 115. Various embodiments could set triggers based upon the presence or absence of specific people (e.g., the occupant of an office, a manager, a meeting organizer, etc.). Other triggers could be set based upon the presence (or absence) of anyone in the environment 110, 115. Light switches, for example, may be activated based upon the presence of any person in the environment 110, 115, whereas AV equipment, food/beverage equipment or other resources may be activated only when a specifically-approved user (e.g., a manager or meeting organizer) is present. Other techniques for detecting occupancy could be equivalently used, as set forth in additional detail below.

Data collected from the various sensors 111 may be processed locally by the sensors 111 and/or delivered to controller 120 for further processing, as desired. Sensor data may be transmitted wirelessly in some embodiments, and/or sensor data may be delivered via a network, bus, cable or other physical transport as appropriate. In various embodiments, some or all of the sensors 111 connect to the workplace network 105 via an IEEE 802.11 (WIFI), IEEE 802.15 (BLUETOOTH or similar wireless personal area network), IEEE 802.16 (WIMAX) or similar wireless interface, although other types of sensors 111 may be coupled to the network 105 via an IEEE 802.3 (ETHERNET) or similar wired interface as desired.

FIG. 1 shows two work space environments 110, 115 for simplicity, but other embodiments could also include sensors 111 and/or resources 112 in the lobbies, foyers, break area, cafeterias, elevators, hallways and/or other areas of the workplace. Many different types of triggers could be designed based upon the presence or absence of different people in any desired location.

Controller 120 is a hardware device that is programmed using software, firmware and/or other programmable logic to activate, deactivate and/or otherwise control the various resources in the different environments 110, 115 of the workspace 100. In various embodiments, controller 120 is implemented with specialized programming operating within a conventional computer system, although other embodiments could implement controller 120 with specialized hardware, including any types of computers, servers or the like, as desired. Controller 120 may physically reside within workspace 100 in some embodiments, although controller 120 may be equivalently located elsewhere, such as in a remotely-located data center or the like. Other embodiments could use cloud based computing resources via the Internet or another network to deliver data and control signals for offsite or other remote processing, as desired. Although FIG. 1 shows a single controller 120 that controls the various resources 112A-B in environments 110, 115, other embodiments may divide the functionality of controller 120 between any number of processors, including processors located in one or more different physical or logical locations.

In the example of FIG. 1, controller 120 includes processing hardware including a processor 121, memory 122 and input/output interfaces 123 as appropriate. Processor 121 is any sort of microprocessor, microcontroller, digital signal processor or the like capable of executing program instructions to implement the various functions described herein. Program instructions and data may be stored in any sort of memory 122 or other data storage 124, which may be implemented using any type of static, dynamic, flash or other memory, and/or with any sort of optical, magnetic or other data storage, as appropriate. Data storage 124 could be equivalently or alternately implemented with any sort of remote storage, such as any sort of file server or cloud storage that may be available. Interfaces 123 may include electrical and/or mechanical interfaces for transmitting and receiving data, or for otherwise communicating with other devices as desired. Example interfaces 123 could include any hardware for communicating with a bus, network and/or other wired or wireless data conduit as appropriate for receiving data from the various sensors 111 and transmitting control instructions to the various resources 112 in workspace 100.

Controller device 120 is programmed or otherwise configured to execute software, firmware or other logic to provide a control system 125 for one or more environments 110, 115 of workspace 100. In the example illustrated in FIG. 1, control system 125 includes hardware or software modules for scheduling activities (module 126), processing trigger events indicated by the schedule and/or from sensors 111 (module 127), and for issuing commands to the various controlled resources 112 (module 128). In various embodiments, each module 126, 127, 128 represents software or firmware logic that can be stored (e.g., in memory 122 or storage 124) and executed by processor 121. Particular algorithms and processes executed by the various modules are set forth below, and other embodiments could equivalently provide additional or alternate modules executing other types of logic, as desired. Further, the example modules and hardware implementations described herein could be supplemented or modified in any way. Multiple processors and/or cloud processing resources could cooperate to provide the various functions described herein, for example, and/or the various functions described herein could be organized into different modules in any number of equivalent ways.

Inputs and other data can be received from sensors 111 in any manner. In various embodiments, module 127 or the like receives trigger data transmitted via network 105 via interface 123. The received data is formatted or otherwise processed for subsequent analysis. The particular formatting/processing that occurs varies depending upon the embodiment and the types of data collected by the various sensors 111, and several examples are provided herein. Camera-type sensors 111, for example, could provide digital imagery of any resolution that shows a then-current picture of the measured space. Equivalent embodiments could provide inputs from arrays of infrared, weight, heat or other sensors 111, as desired. Note that captured data from sensors 111 may be manipulated by the sensors themselves and/or any intervening hardware so that the data received by controller 120 is the result of image processing or other analysis of the raw data captured by sensors 111. Alternatively, control device 120 could receive the raw data captured by the sensors, thereby reducing the computational power needed by the various sensor devices 111 (although increasing the processing load on controller 120). Received data could be augmented with other factors (e.g., date or time of day, emergency status, temperature/humidity data, etc.) as appropriate.

Generally speaking, controller 120 maintains one or more lists 140 of activities that are occurring within the different environments 110, 115 of the workplace 100. Lists 140 may be stored in memory 122 and/or in storage 124 as desired. Typically, lists 140 are maintained within a database management system (DBMS). Such a system could be based upon conventional database software (e.g., database products available from Microsoft, IBM, Oracle, MySQL, SAP and/or any other vendor), as desired. The database may reside on the same computing hardware as controller 120 (e.g., storage 124), or separate computing resources could be provided, including any sort of cloud-based computing resources. The database may be structured in any manner, including any sort of relational, object-oriented or other structure.

Activities in lists 140 represent meetings, gatherings or other scheduled events that occur within a particular environment 110, 115. Each activity is generally associated with an environment 110, 115 (e.g., a meeting room or the like). Each environment, in turn, is associated with one or more controllable resources 112 that are present in the environment 110, 115. A conventional meeting room, for example, may have separately-controllable lights, climate controls, AV equipment, food/beverage resources, outlets, telecommunication equipment and/or the like. The database associates each of the controllable resources 112 within the scheduled environment with a trigger that prompts the controller 110 to activate, deactivate or otherwise control the resource. Triggers may be event based (e.g., based upon sensor data) or schedule based (e.g., based upon a scheduled time). Typically, the occurrence of a trigger prompts controller 110 to generate a command or control signal via network 105 to the actuator associated with the resource 112, although other embodiments could control the various resources 112 in any other manner.

In various embodiments, controller 120 receives scheduling data about various activities 132 from a calendar server 130. Calendar server 130 may be compatible with personal productivity software used by employees in the workspace, including software that is currently used to schedule meetings or the like. Examples of such software could include Microsoft Outlook, Google Calendar, Apple iCal, and/or the like. When a meeting or other activity 132 is scheduled, then data about the activity (including the location) is obtained by controller 120, as appropriate. Activity data 132 may be supplied in real time as server 130 receives notices of new activities in some embodiments; other embodiments could use polling from controller 120, batch transfer on any temporal basis (e.g., hourly, daily), and/or any other techniques as desired. Calendar server 130 may be a physical server in some embodiments, while other embodiments may implement calendar server 130 using cloud-based or remotely-located processing capabilities. In still other embodiments, the functionality of calendar server 130 and controller 120 may be combined into a common system executing on shared hardware. A separate calendar server 130 may not be needed in all embodiments.

Figure 2:
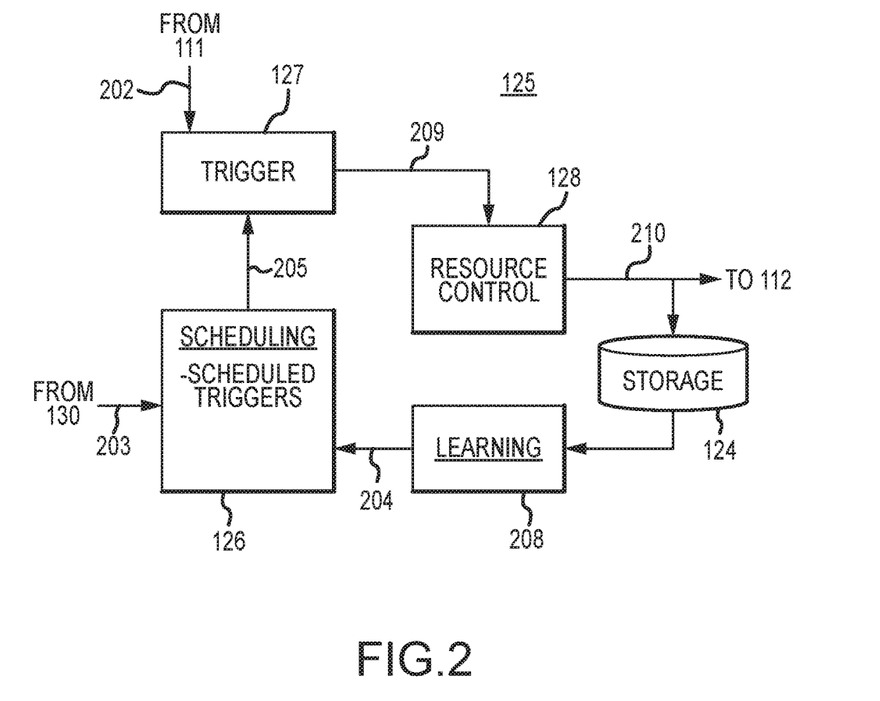
FIG. 2 is a diagram of an example control system.

FIG. 2 shows additional detail about an example control system 125 operating within controller 110. Activities 132 planned for the various environments 110, 115 are tracked by a scheduling module 126. As noted above, activity data 203 may be obtained from a separate calendar server 130 in some embodiments. Alternatively, the data may be directly entered (e.g., via a web interface or the like) by one or more users of the system, or obtained in any other manner.

Scheduling module 126 suitably associates the scheduled activities 132 with one or more controllable resources 112 present in the environment 110, 115 where the activity 132 will take place. The various resources 112, in turn, are associated with one or more triggers that will activate further control of the resource 112. As noted above, triggers may be schedule based and/or event based, as desired. For scheduled triggers, scheduling module may use conventional CRON, AT, SYSTEMD, LAUNCHD or similar constructs, as appropriate. Other embodiments may use DBMS resources or the like to generate triggers 205 and/or to notify resource controller 208 at the appropriate times so that suitable control instructions are sent to the controlled resource. Scheduling module 126 may also notify trigger module 127 to watch for any event-based triggers that may be relevant to one or more scheduled activities.

In the illustrated embodiment, trigger module 127 suitably receives data 202 from sensors 111 via interface 123 and network 105. In some embodiments, trigger module 127 may also receive trigger signals 205 from scheduling module 126 to indicate that a scheduled trigger has occurred. This data 202 and 205 may indicate the occurrence of a trigger 209 that initiates control of a resource 112. To that end, event trigger module 127 typically includes an interrupt-type handler that recognizes the occurrence of triggers in data 202 (and/or signals 205) and that notifies the resource control module 128 upon the occurrence of a trigger 209 that is relevant to one or more activities in lists 140. As noted above, some embodiments may need to perform pre-processing on the received data 202 to properly interpret whether a trigger event has occurred. Such pre-processing may include, for example, processing of received image data to determine if one or more persons are still present in a room or other environment. Other types of sensors 111 may provide data in any number of other formats, as appropriate.

Upon the occurrence of a relevant event or schedule-based trigger 209, trigger handler 127 suitably notifies the resource control module 128, which in turn generates a control signal 210 that is sent via interface 123 and network 105 to the relevant resource 112. The type of control signal 210 that is generated will vary from embodiment to embodiment based upon the types of controlled resources 112 and their associated actuation devices and protocols. Control signals 210 may be compatible with any current or subsequently developed home or building control protocols. The particular formats and protocols of the different types of control signals 210 needed for the different resources 112 may be defined in XML or tables stored within the database, or otherwise made available to controller 120 so that different types of resources 112 may be supported.

In various embodiments, relevant triggers 209 and/or control instructions 210 may be stored (e.g., in memory 122 or storage 124) for further processing. In some cases, it may be possible to recognize patterns in control behavior so that triggers 204 can be automatically scheduled with a relatively high level of confidence, even though no human operator has requested that such triggers 204 be tracked. If a meeting room is routinely used at a particular day or time, for example, then learning analysis module 208 may recognize this pattern so that the climate controls are set to comfortable levels even if the room is not expressly scheduled for an activity 132. Other patterns may react to seasonal changes in behavior, changes in behavior due to holidays or other special events, or simply repetitive behaviors. Any type of pattern analysis or other learning logic 208 could be used to improve the operation of control system 125, as desired.

Figure 3:
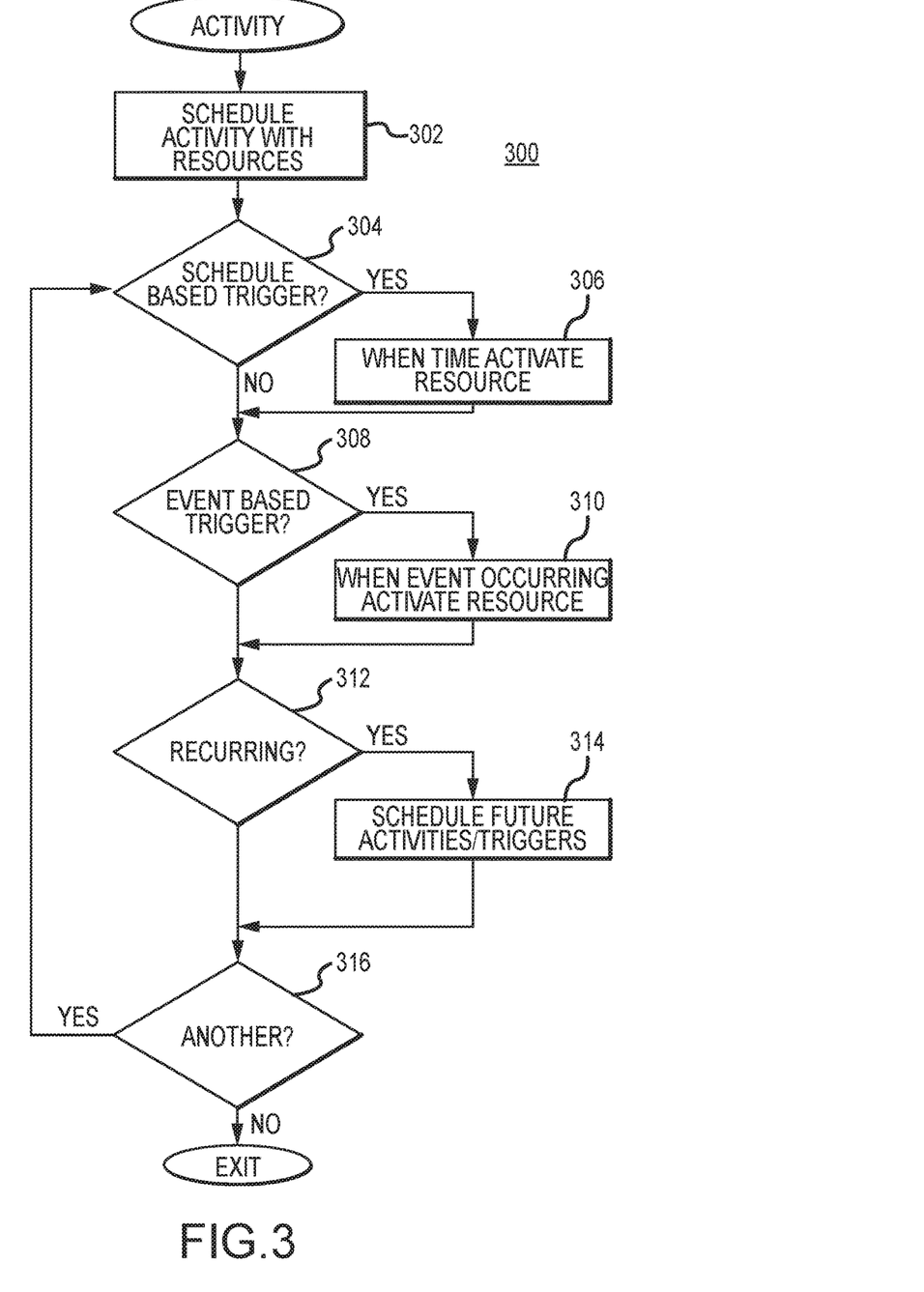
FIG. 3 illustrates an example process for controlling resources within a workplace.

FIG. 3 shows a flowchart of an example process 300 to automatically control the resources 112 that are associated with an environment 110, 115 during an activity 132. Typically, process 300 would be executed by processing logic 125 in controller 120, as noted above, although other embodiments could perform equivalent processing with cloud resources and/or other processors that are separate from controller 120. The particular modules and functions shown in FIG. 3 are illustrative, and practical embodiments may combine or organize the various functions of process 300 in any other temporal or logical manner, as desired.

As noted above, each activity 132 is scheduled in a list 140 or other structure within a database or other logical system available to controller 120 (function 302). Activities 132 may be scheduled with reference to a separate calendar server 130 as described above, or in any other manner. As noted above, each activity 132 is associated with a location (e.g., environment 110) that has one or more controllable resources 112. Each controllable resource 112 is controlled in response to the occurrence of a trigger 209, as described above.

Schedule based triggers, for example, are initiated based upon the date and/or time. If triggers are scheduled (function 304), then the trigger will be generated and processed at the appropriate time (function 306). As noted above, scheduled triggers may direct that climate controls are activated in time to place the environment 110 at a comfortable temperature prior to the start of the activity 132. Other scheduled triggers could activate computing, telecommunications and/or AV equipment, food/beverage service equipment and/or the like just prior to the activity 132. Other scheduled triggers could unlock a door, deactivate an alarm and/or take other actions as necessary. Other scheduled triggers could be formulated to perform any number of different functions, as desired.

Event triggers are initiated based upon the sensed occurrence of a specific event. Typically, an event trigger will be initiated in response to the receipt of data 202 received from one or more sensors 111 (function 308). As noted above, event based triggers may correspond to one or more attendees arriving at the activity, one or more attendees departing from their office when the time of the activity is near, or for any other purpose. Events may be sensed by any number of different sensors 111, including any sort of card readers, wireless readers (e.g., RFID sensors), proximity sensors, device trackers and/or the like. Other sensors 111 may supply digital imagery or the like that can be processed to identify changes in scenery that correspond to the presence or absence of people. Many other types of sensors 111 are capable of detecting any number of different events, as desired. Upon the occurrence of a relevant event, a trigger is generated to direct the relevant resource 112 to take the appropriate action (function 310).

As noted above, activities and/or events may be recurring on any temporal bases (function 312). Various embodiments are able to automatically detect recurring activities/events, and to schedule future triggers as appropriate (function 314). Other embodiments may rely upon user inputs to identify recurring events, as desired. Control system 125 may simultaneously process triggers 209 for any number of activities 132 (function 316), with any number of control signals 210 being sent to any number of different resources 112 across any number of different environments 110, 115 of workplace 100. The systems described herein are readily scaled to enterprises of any size, and having any number of users, environments, activities, sensors and resources, as desired.

Triggered actions 209 are not limited to actions performed prior to the activity 132. Other actions could be triggered in response to the end of the activity 132, for example, as indicated by the time of the meeting having elapsed, by a sensed lack of persons remaining in the activity environment, and/or by any other factors. Climate controls, for example, could be triggered to resume settings for inactive space after the meeting has concluded, or after an appropriate amount of time has passed. Post-activity triggers may be listed within list 140, for example, and certain resources may be associated with multiple triggers, as desired. A climate control, for example, may be associated with both a pre- and post-activity trigger. Such triggers may be based upon time, or sensed events (e.g., the arrival or departure of one or more meeting attendees). Other resources may be associated with multiple scheduled and/or event based triggers as appropriate.

The sensing and control concepts described herein are not limited to public or shared environments of workspace 100. Similar concepts could equivalently control lights, computing devices, climate controls and other resources 112 operating within offices, cubicles or other more private spaces. Indeed, various embodiments could set triggers so that when a user moves from an office to a meeting space, the user's office resources are placed into a low power mode while the meeting space resources are in an active use mode. Conversely, when a sensor 111 detects that the user has left the meeting or that the meeting is over, then event based triggers could reactivate lights, computers and other resources within the user's office space. Again, any number of triggers that are associated with any number of resources could be tracked within system 125, including resources that may not be physically present within the activity space itself. That is, a list 140 for a meeting activity 132 could schedule and track trigger information for resources 112 located in participant's offices or elsewhere in workspace 100 even though those resources are physically located outside of the activity space 110, 115, as desired.

By using different types of triggers 209 to control different types of resources 112, a very flexible yet powerful and effective control system can be created. Different types of resources in shared spaces can be automatically activated, deactivated and otherwise controlled in an intelligent manner so that energy consumption is more wisely managed.

The various processes, devices and systems described herein may be readily adapted for any number of equivalent environments and applications. The term "exemplary" is used herein to represent one example, instance or illustration that may have any number of equivalent alternatives. Any implementation described herein as "exemplary" is not necessarily to be construed as preferred or advantageous over other implementations, but rather as a mere example. While several example embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A process executable by a controller device that controls a plurality of environmental control resources operating within a workplace, the process comprising:
    maintaining an activities database by the controller device to thereby track a plurality of activities occurring within shared spaces of the workplace, wherein the database is maintained in a data storage medium available to the controller device and wherein each of the activities is associated in the database with at least one of the environmental control resources that is physically located in the shared space where the activity is occurring, and wherein each of the environmental control resources for each of the activities in the database is associated with a trigger event;
    receiving, by the controller device, digital communications that indicate occurrences of one or more trigger events associated with the activities in the database; and
    upon receiving a message indicating that an occurrence of the trigger associated with an activity in the database has occurred, the controller device automatically communicating with the environmental control resource that is associated with the trigger to thereby actuate the environmental control resource prior to the start of the activity in the workplace.

2. The process of claim 1 wherein at least one of the messages indicating that a trigger has occurred is a message from a calendar service that transmits the message indicating the trigger at a pre-defined time based upon a start time of the activity occurring within the shared space.

3. The process of claim 1 wherein at least one of the environmental control resources is a climate control resource associated with one of the activities, and wherein one of the triggers associated with the climate control resource is a schedule-based trigger that occurs at a pre-defined time prior to the beginning of the activity to thereby allow a temperature of the workplace to change prior to the beginning of the activity.

4. The process of claim 1 wherein at least one of the triggers associated with at least one of the environmental control resources is an event-based trigger that is received from a sensor device in response to an event occurring within the workplace.

5. The process of claim 1 wherein at least one of the triggers associated with at least one of the environmental control resources is an event-based trigger that is received from a sensor device indicating that a participant in the activity is moving toward the shared space where the activity is scheduled to occur.

6. The process of claim 1 wherein the event-based trigger is generated by a sensor located in proximity to the participant prior to the activity.

7. The process of claim 1 wherein the sensor is a radio frequency identification (RFID) reader.

8. The process of claim 1 wherein at least one of the triggers associated with at least one of the environmental control resources is an event-based trigger to activate lighting in the shared space where the activity is occurring, wherein the event-based trigger occurs in response to a participant in the activity moving toward the activity.

9. The process of claim 1 wherein the activity is a meeting occurring in the shared space of the workplace, wherein a first one of the triggers is an event-based trigger that activates lighting resources in the shared space when a participant in the meeting is detected to be moving toward the shared space, and wherein a second one of the triggers is a schedule-based trigger that automatically activates a climate control resource associated with the shared space of the workplace at a pre-determined time prior to the meeting to thereby adapt the climate of the shared space in time for the meeting.

10. The process of claim 9 wherein a third one of the triggers is an event-based trigger that deactivates the lighting resources in the shared space and that automatically deactivates the climate control resource associated with the shared space of the workplace to thereby adapt the climate of the shared space after the meeting has concluded.

11. A controller device that controls a plurality of resources operating within a workplace, the controller device comprising a processor, a memory and input/output interfaces, wherein the memory stores a plurality of instructions that, when executed by the processor, perform a process comprising:
  maintaining an activities database by the controller device to thereby track a plurality of activities occurring within shared spaces of the workplace, wherein the database is maintained in a data storage medium available to the controller device and wherein each of the activities is associated in the database with at least one of the environmental control resources that is physically located in the shared space where the activity is occurring, and wherein each of the environmental control resources for each of the activities in the database is associated with a trigger event;
  receiving, by the controller device, digital communications that indicate occurrences of one or more trigger events associated with the activities in the database; and
  upon receiving a message indicating that an occurrence of the trigger associated with an activity in the database has occurred, the controller device automatically communicating with the environmental control resource that is associated with the trigger to thereby actuate the environmental control resource prior to the start of the activity in the workplace.

12. The controller device of claim 11 wherein at least one of the triggers associated with at least one of the environmental control resources is a schedule-based trigger that occurs at a pre-defined time.

13. The controller device of claim 11 wherein at least one of the environmental control resources is an HVAC resource associated with one of the activities, and wherein one of the triggers associated with the HVAC resource is a schedule-based trigger that occurs at a pre-defined time prior to the beginning of the activity to thereby allow a temperature of the workplace to change prior to the beginning of the activity.

14. The controller device of claim 11 wherein at least one of the triggers associated with at least one of the environmental control resources is an event-based trigger that occurs in response to an event.

15. The controller device of claim 11 wherein at least one of the triggers associated with at least one of the environmental control resources is an event-based trigger that occurs in response to a participant in the activity moving toward the activity.

16. The controller device of claim 11 wherein the event-based trigger is generated by a sensor located in proximity to the participant prior to the activity.

17. The controller device of claim 11 wherein the sensor is a radio frequency identification (RFID) reader.

18. The controller device of claim 11 wherein at least one of the triggers associated with at least one of the environmental control resources is an event-based trigger to activate lighting in the shared space where the activity is occurring, wherein the event-based trigger occurs in response to a participant in the activity moving toward the activity.

19. The controller device of claim 11 wherein the activity is a meeting occurring in the shared space of the workplace, wherein a first one of the triggers is an event-based trigger that activates lighting resources in the shared space when a participant in the meeting is detected to be moving toward the shared space, and wherein a second one of the triggers is a schedule-based trigger that automatically activates a climate control resource associated with the shared space of the workplace at a pre-determined time prior to the meeting to thereby adapt the climate of the shared space in time for the meeting.

20. The controller device of claim 19 wherein a third one of the triggers is an event-based trigger that deactivates the lighting resources in the shared space and that automatically deactivates the climate control resource associated with the shared space of the workplace to thereby adapt the climate of the shared space after the meeting has concluded.

* * * * *